W. J. McGAVOCK.
CURRENT MOTOR.
APPLICATION FILED DEC. 16, 1919.
1,400,965.
Patented Dec. 20, 1921.
2 SHEETS—SHEET 1.
FIG. 1.
FIG. 4.
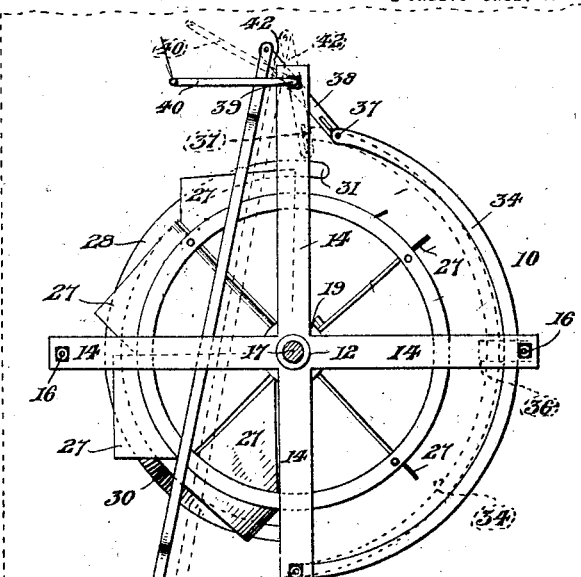
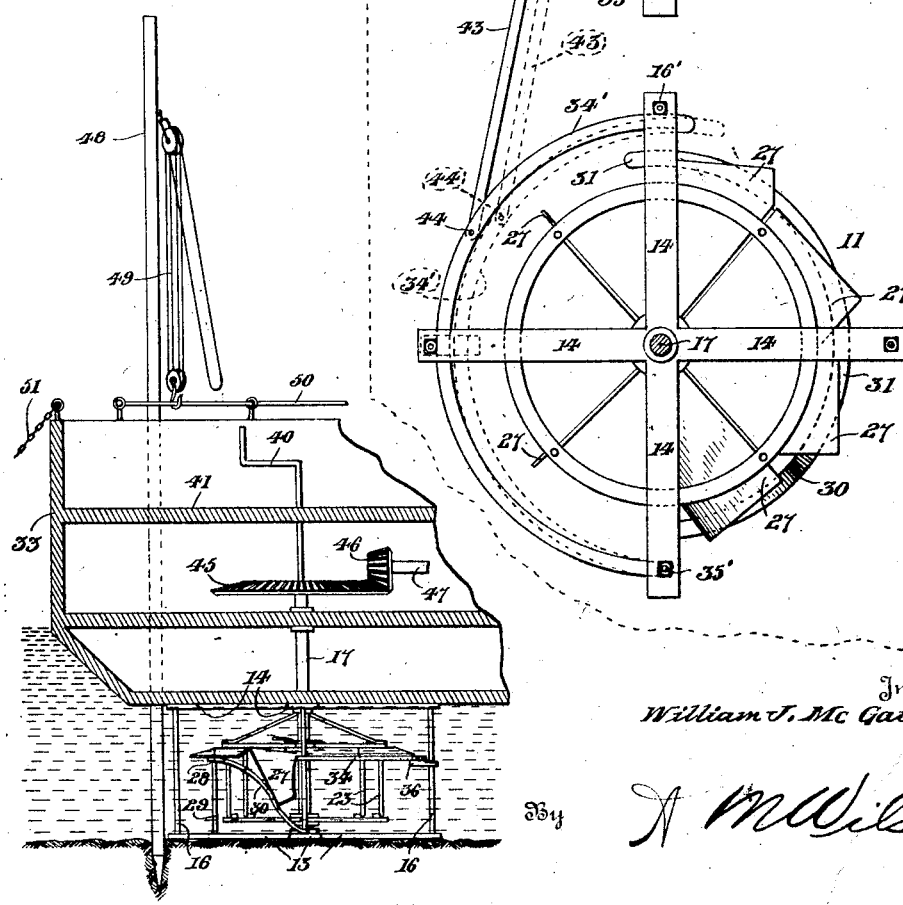
Inventor
William J. McGavock
By N. M. Wilson
Attorney

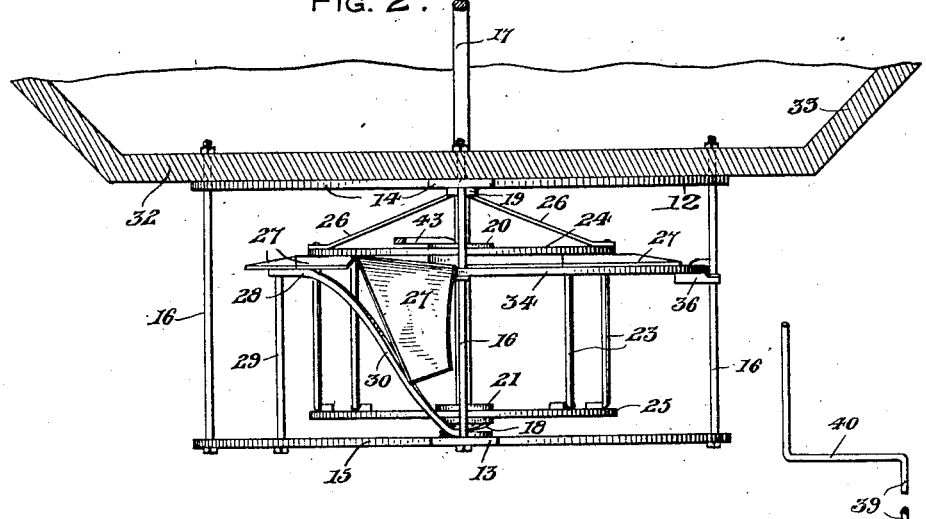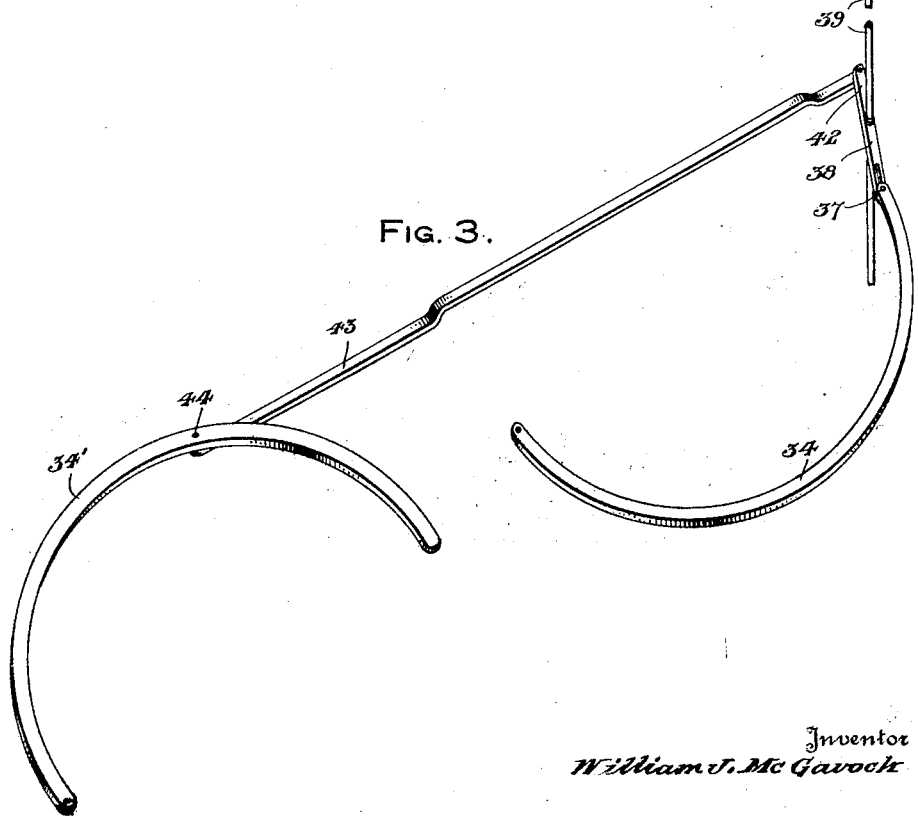

UNITED STATES PATENT OFFICE.

WILLIAM J. McGAVOCK, OF MEMPHIS, TENNESSEE.

CURRENT-MOTOR.

1,400,965. Specification of Letters Patent. Patented Dec. 20, 1921.

Application filed December 16, 1919. Serial No. 345,322.

*To all whom it may concern:*

Be it known that I, WILLIAM J. Mc-GAVOCK, a citizen of the United States of America, residing at Memphis, in the county of Shelby and State of Tennessee, have invented certain new and useful Improvements in Current-Motors, of which the following is a specification.

The primary object of the invention is the provision of an inexpensive power plant in the nature of a motor adapted for driving by such currents as those of the ocean and streams, including tide waters, provision being made for the installation of a plurality of units simultaneously operable as well as controlled.

A further object of the invention is the provision of a current motor readily positioned submerged for use by a suitable craft either above or below the motor, arrangement being made for rendering the motor inoperative at will, and for the simultaneous control of a plurality of units, forming the power plant; the separate units being adapted for opposite rotation for increasing the stability of the plant.

A still further object of the invention is the provision of current wheels adapted for turning in opposite directions and provided with simultaneous controlling means whereby the entire plant may be rendered operative or inoperative at will from a suitable point above the water where the power of the wheels is adapted to be utilized.

With these general objects in view the invention consists of the novel combination and arrangement of parts hereinafter more fully described, illustrated in the accompanying drawings, and pointed out in the appended claims.

In the drawings forming a part of this application and in which like designating characters refer to corresponding parts throughout the several views, Figure 1 illustrates a power plant comprising two current wheels after the manner of my invention with the power shafts in horizontal section and the controlling means illustrated by dotted lines when turned off, the support for the wheels also being illustrated by dotted lines, Fig. 2 is a vertical transverse sectional view through a hull with a current wheel therebeneath illustrating one manner of mounting my invention, Fig. 3 is a perspective view, the brake members or guides employed for controlling adjacently positioned wheels illustrated in connection with the simultaneous actuating means therefor and Fig. 4 is a vertical longitudinal sectional view of a boat provided with the invention illustrating a manner of utilizing the power from the wheels and for adjusting the motor-supporting member in the water.

Referring more in detail to the drawings, my invention consists of a current wheel especially adapted for use in tandem or pairs with the adjacent wheels such as 10 and 11 adapted for revolution in opposite directions by the power of the water. Each of the wheels 10 and 11 consists of a frame formed of top and bottom members 12 and 13, in the form of crossed bars 14 and 15 respectively connected adjacent their outer free ends by posts 16.

A central shaft 17 is journaled through the upper frame 12 and has a suitable thrust bearing 18 centrally of the lower frame 13, a securing collar 19 adjacent the upper frame 12, retaining the shaft in vertical position for rotation as a power shaft. Spaced hubs 20 and 21 are secured to the shaft 17 and carry annular members 24 and 25 which are supported in spaced relation by perpendicular bearing rods 23 which connect the outer edges of the said annular members 24 and 25, while the upper annulus is connected by braces 26 with the aforementioned positioning collar 19.

As will be apparent, the hubs 20 and 21 with the rods 23 and annuli 24 and 25 as well as the braces 26, and collar 19, revolve between the frame members 12 and 13, with the shaft 17.

A blade 27 is swingingly suspended from the upper side of each rod 23, adapted for normal positioning vertically in contact with the vertical outer side of its supporting frame rod for presenting its entire surface to the force of the current for revolving the wheel and its shaft 17. A bracket 28 of double curvature is carried between the frames 12 and 13, by uprights 29, the said bracket being positioned at one side of the wheel within the path of movement of the blades 27, so that said blades will ride upwardly upon the inclined portion 30 of the bracket 28, when the blades successively reach substantially their down-stream extremity of movement. In other words, the blades 27 are adapted to travel up the incline 30 of the bracket 28 in a feathering movement after having received the full impulse or power of the current, the blades riding horizontally over the bracket 28 in an elevated position and dropping off of the free end 31 of the bracket at the upstream side of the wheel to again present themselves to the force of the current.

My current wheel may be employed singly or in plurality as found desirable, the wheels being secured in submerged position in any desired manner such as by attaching the posts 16 to the bottom 32 of a boat or scow 33.

The wheels may have to be mounted by means of the posts 16, upon a boat, raft, or float, for ready transfer to the position desired for use and sunk to the desired depth within the water for receiving the power of the current upon the blades 27. It will be apparent that the blades 27 are inoperative when horizontal, and that such arcuate guides as 34 positioned in the same horizontal plane as the horizontal portions of the brackets 28 will render the entire wheel inoperative when the guide 34 is positioned to receive the blades 27 from the bracket end 31, preventing the blades from dropping to their vertical operative positions. The guide 34 of the current wheel 10 is pivoted as at 35 to one of the posts 16 with its central portion sliding in a block member 36 upon the adjacent post and with its opposite end articulated by a pin and slot connection 37 with a lever 38 through which an upright shaft 39 is secured, the said shaft being journaled between the frames 12 and 13.

A crank 40 at the upper end of the shaft 39 extends above the wheel to any suitable point such as above the deck 41 of the scow 33 as illustrated in Fig. 4. Upon turning the crank 40 in one direction, the lever 38 pulls the guide 34 inwardly toward the bracket 28 to the dotted line position illustrated in Fig. 1 of the drawings, permitting the blades 27 to travel from the free end 31 of the bracket 28 onto the adjacent end of the guide 34. The blades will then travel horizontally until nearing the pivot point 35 where they drop off of the guide 34 only to be received by the inclined portion 30 of the bracket 28. The force of the current having substantially no effect upon the horizontal blades, the wheel 10 is brought at rest by this inward movement of the guide 34 while upon reversing the rotation of the shaft 39, the guide is swung outwardly clear of the blades 27 permitting the blades to take the force of the current when the blades swing to their vertical positions.

While a single unit or wheel such as 10 may be employed, the use of a companion wheel 11 is especially advantageous, the wheel 11 being arranged to revolve in an opposite direction from the wheel 10 thereby neutralizing the unbalanced effect upon the support such as the scow 32. The lever 38 has an extension 42 for pivotally attaching one end of a rod 43 with its opposite end pivoted as at 44, to the guide 34' of the companion wheel 11. The wheel 11 being the counterpart of the wheel 10, a repetition of the description is deemed unnecessary it being noted however, that the guide 34' is pivoted at one end as at 35' to the stationary frame of the wheel while the opposite free end of the guide 34' is unattached but engages the post 16' at the opposite side of the wheel forming a stop when the guide is in its inoperative outward position, as illustrated in Fig. 1.

The complete operation of the power plant will be apparent from this detailed description thereof, the guides 34 being simultaneously operable by the lever crank 40, for inward and outward movements to render the wheels idle or active at the will of the attendant. The manner of utilizing the power generated by the current wheels may be varied at will such an arrangement as herein illustrated in Fig. 4 being found especially serviceable and consisting of gear wheels 45 carried by the power shafts 17 with meshing pinions 46 transferring the power to a common power shaft 47 horizontally mounted upon the boat 33. It will be evident that any number of blades 27 may be employed in the current wheels of the construction herein set forth and that the actuating crank 40 for the controlling guides 34, 34', may be positioned wherever desired, such details of construction being matters relating to particular installations of the power plant.

In Fig. 4 the current wheel is illustrated as being secured beneath the bottom of the hull 33, with vertical spars 48 at opposite sides of the hull adapted for maintaining the same in position during vertical movement, block and tackle members 49 being preferably connected between the spars 48 and a railing or slideway 50 upon the adjacent gunwale of the hull. It will be understood that this arrangement is serviceable in tidal waters and the whole is suitably anchored by a chain 51 at the adjacent end or bow of the craft. The current wheels may be positioned in the manner described either adjacent the bottom of the water or at any point beneath the surface thereof, for receiving the maximum force of the current in its prevailing direction of travel, the feathering of the blades 27 at the opposite sides of the wheels of each pair of motor members being of considerable importance as well as the ready manipulation of the blade guides of each wheel simultaneously for rendering the entire plant instantly operative or inoperative at the will of the distantly positioned attendant.

While the form of the invention herein set forth is by way of illustration as a preferred embodiment of the structure, it will nevertheless be understood that changes may be made therein, without departing from the spirit and scope of my invention as claimed.

Having thus described my invention, what I claim as new and desire to secure by Letters Patent is:—

1. A power plant comprising adjacently positioned current wheels adapted for revolution in opposite directions, feathering means for the blades thereof, positioning guides lying in the same plane with the upper end of the feathering means adapted for receiving the blades from said feathering means, whereby the plant is rendered inoperative and simultaneous actuating means for said guides.

2. A power plant comprising a plurality of oppositely positioned current wheels including impulse blades, brackets for the wheels adapted for rendering the blades inoperative in horizontal positions, at the limit of their power strokes and simultaneously operable guides adapted for receiving the blades from said brackets positioned in substantially the same horizontal plane as the free up-stream ends of the brackets.

3. A power plant comprising a plurality of oppositely positioned current wheels including impulse blades, brackets for the wheels adapted for rendering the blades inoperative in horizontal positions at the limit of their power strokes, guides for the blades pivoted in substantially the same planes as the upper ends of the brackets adapted for receiving the inoperatively positioned blades from the latter when the guides are shifted inwardly and simultaneous actuating means for the guides of said wheels.

4. A power plant comprising current wheels having swinging impulse blades adapted for presentation to the force of the current at opposite sides of the device, horizontal guides at the operative sides of the wheels pivoted at corresponding ends, actuating means for the guide of one wheel and operative connections between said actuating means and the guide of the other wheel.

In testimony whereof I affix my signature.

WILLIAM J. McGAVOCK.